United States Patent [19]

Onuki et al.

[11] 4,432,208

[45] Feb. 21, 1984

[54] COLD TRAP

[75] Inventors: Osamu Onuki, Kasama; Toyohiko Kirisawa, Mito, both of Japan

[73] Assignee: Doryokuro Kakunenryo Kaihatsu, Jigyodan, Tokyo, Japan

[21] Appl. No.: 422,287

[22] Filed: Sep. 23, 1982

[30] Foreign Application Priority Data

Sep. 25, 1981 [JP] Japan ............................. 56-143107[U]

[51] Int. Cl.³ .............................................. B01D 8/00
[52] U.S. Cl. ....................................... 62/55.5; 55/269; 165/119; 376/210
[58] Field of Search ...................... 62/55.5; 176/37, 65; 55/269; 165/119

[56] References Cited

U.S. PATENT DOCUMENTS

| | | | |
|---|---|---|---|
| 2,248,909 | 7/1941 | Russell | 62/55.5 |
| 3,292,383 | 12/1966 | Charles et al. | 62/55.5 |
| 3,304,731 | 2/1967 | Bills et al. | 62/55.5 |
| 3,552,485 | 1/1971 | Le Jannou | 165/119 |
| 3,848,423 | 11/1974 | Renaux | 62/45 |

*Primary Examiner*—Ronald C. Capossela
*Attorney, Agent, or Firm*—Fleit, Jacobson, Cohn & Price

[57] ABSTRACT

A cold trap including a section for cooling inflowing liquid sodium, a section for trapping impurities in the sodium, and a double-walled cylindrical structure disposed between the cooling section and the trapping section. The double-walled structure is filled with a heat-insulating gas, and is closed at its upper end but open at its lower end. An expanded portion designed for storing the heat-insulating gas is formed at the open lower end or in the vicinity thereof of the double-walled structure.

5 Claims, 7 Drawing Figures

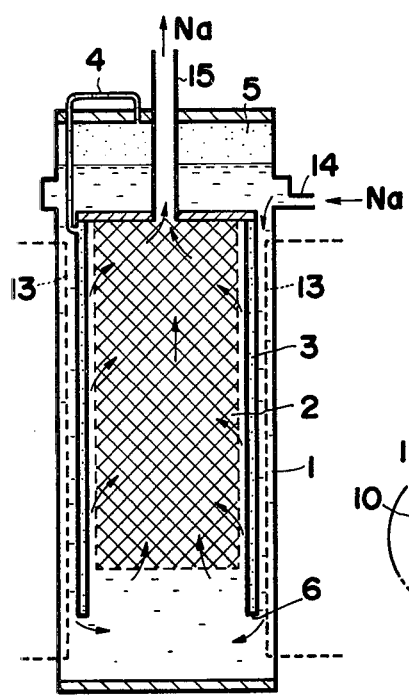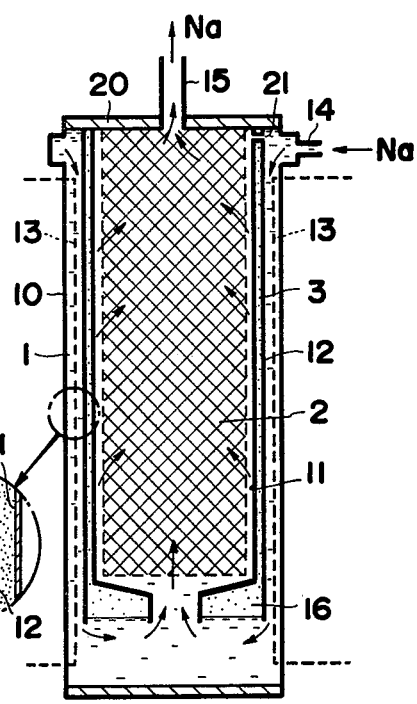

COLD TRAP

BACKGROUND OF THE INVENTION

This invention relates to an improvement in the cold trap of a type having a heat-insulating gas layer between a cooling section which cools an inflowing liquid sodium and a trapping section which traps impurities in the liquid sodium.

A cold trap is a device for refining liquid sodium by precipitating impurities in the sodium due to the differences in saturated solubility (when liquid sodium containing impurities is cooled to about 140° C., the impurities become supersaturated and are separated out) and by trapping the thus precipitated impurities in meshes disposed in an impurity trapping section of low temperature. In conventional cold traps, as typically illustrated in FIG. 1, a heat-insulating gas layer 3 is provided between an inflowing liquid sodium cooling section 1 and an impurity trapping section 2 so as to prevent the exchange of heat between the impurity trapping section (low-temperature section) 2, and the sodium cooling section 1 which is higher in temperature than the trapping section. Thus, the impurity trapping section 2 in which the meshes are filled is made uniform in temperature, thereby allowing the effective utilization of the entire volume of meshes for trapping the impurities. Reference number 13 indicates a heat-conducting pipe adapted for passing a cooling gas which cools the inflowing liquid sodium in the cooling section 1. Reference numbers 14 and 15 indicate a sodium inlet pipe and a sodium outlet pipe, respectively.

The heat-insulating gas layer 3 comprises a double-walled structure consisting of an inner cylinder and an outer cylinder which are closed at both upper and lower ends. An inert gas such as argon or nitrogen is enclosed in the space in this double-walled cylindrical structure. This space communicates with a gas reservoir 5 at the top of the cold trap through a pressure equalizing pipe 4 so as to eliminate any pressure difference between the heat-insulating gas and the sodium to prevent the likelihood of excess stress in the sides of the double-walled structure.

However, with cold traps of such a conventional construction, if a large temperature difference is produced between the inner and outer cylinders of the heat-insulating gas layer 3, the component members of the layer may be deformed or damaged because of the differences in the amount of thermal expansion or contraction between the inner and outer cylinders. In the worst case, the heat-insulating gas could escape, allowing sodium to take its place, thus spoiling the heat-insulating effect of the gas layer and making it incapable of keeping the impurity trapping section 2 at a uniform temperature, resulting in the badly impaired function of the cold trap. Such a phenomenon occurs because of the closing bottom plate 6 provided at the lower end of the double-walled cylindrical structure forming the heat-insulating gas layer in such conventional cold trap, but such a bottom plate 6 is indispensable for the proper functioning of the cold trap.

Under these circumstances, the conventional cold trap are subject to a serious operational restriction, that is, the system must be operated with care to ensure that the temperature difference between the inner and outer cylinders of the heat-insulating gas layer do not exceed a predetermined level (usually about 60° C.) when the temperature of the system is elevated. Thus, for instance, in a purification system of the general testing equipment of a reactor mock-up, it is impossible to raise the sodium temperature in the system above 350° C. in normal operations even if an economizer is provided on the cold trap inlet side. Also, when re-starting after a temporary shutdown of the system due to a power failure or other causes, it is necessary, before re-starting to circulate the sodium, to lower the temperature of the sodium in the system to close to the cold trap temperature so as not to give rise to a temperature difference greater than the level predetermined by the heat-insulating gas layer.

SUMMARY OF THE INVENTION

An object of this invention, therefore, is to provide an improved cold trap which is free of the operating temperature restrictions and has the very high strength and performance of a specifically structured heat-insulating gas layer between a cooling section and an impurity trapping section of the cold trap.

Another object of this invention is to provide an improved cold trap which is simplified in its entire internal construction to enable rationalization of its design and manufacture and is also so designed as to allow even more effective utilization of the internal space as an impurity trapping section.

A cold trap according to this invention is of a construction comprising a section for cooling inflowing liquid sodium, a section for trapping impurities in said liquid sodium and a double-walled cylindrical structure disposed between said cooling section and said trapping section, with the space inside said double-walled cylindrical structure being filled with a heat-insulating gas. The double-walled cylindrical structure is closed at its upper end but open at its lower end, and an expanded portion for storing the heat-insulating gas is formed at the open lower end of said double-walled structure or in the vicinity of the open lower end.

Other objects and advantages of this invention will become apparent as this invention is more fully described hereinafter with reference to the accompanying drawings in which like reference numerals designate like parts throughout.

BRIEF DESCRIPTION OF THE DRAWINGS

FIG. 1 is a schematic illustration of a prior art cold trap;

FIG. 2 is a schematic illustration of an embodiment of this invention;

PREFERRED EMBODIMENTS OF THE INVENTION

Figure 3A:
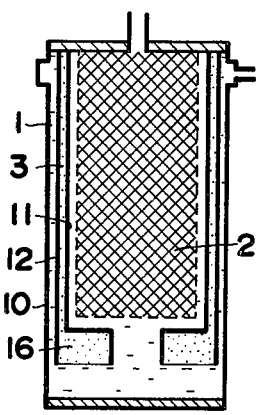
FIGS. 3A and 3B are schematic drawings illustrating the relationship between sodium pressure and the volume of the heat-insulating gas.

An embodiment of this invention is schematically illustrated in FIG. 2. It will be seen that, in this embodiment of the invention, the interior of a cylindrical body member 10 is coaxially partitioned by a double-walled cylindrical structure having an inner wall 11 and an outer wall 12, and the double-walled structure is closed at its upper end by an upper end plate 20. The outside of the structure constitutes a cooling section 1 for cooling an inflowing liquid sodium, while the inside of the structure constitutes a trapping section 2 for trapping impurities in the liquid sodium. These sections 1 and 2 communicate with each other at the bottom portion of the body member 10. A heat-conducting pipe 13 is provided in the cooling section 1 for passing a cooling gas. The sodium fed into the system from a sodium inlet nozzle 14 flows downwards in the cooling section 1 while being cooled therein through the exchange of the heat with the cooling gas in said pipe 13. The sodium is thus cooled down to a predetermined low temperature and reaches the lower part of the cooling section 1. The impurity trapping section 2 of low temperature is packed with stainless steel meshes or the like. The cooled liquid sodium than enters the trapping section 2 where the precipitated impurities in the sodium are trapped, and the thus refined sodium is discharged from a sodium outlet nozzle 15. The above-described construction and operation of the cold trap of this invention are the same as those of the prior art shown in FIG. 1.

The important differences of the present invention from the prior art cold trap of FIG. 1 reside in that the double-walled cylindrical structure consisting of the inner wall 11 and the outer wall 12 is open at its lower end and that an expanded portion 16 designed for storing the heat-insulating gas is formed at the open lower end of the double-walled structure or in the vicinity of the open lower end. The space between the inner and outer walls 11 and 12 and the interior of said expanded portion 16 are filled with an inert heat-insulating gas.

The enclosing of the inert heat-insulating gas in the double-walled structure is carried out in the following manner. The cylindrical body member 10 is first exhansted of air, and then filled with inert gas, such as argon or nitrogen gas. When liquid sodium is introduced into the cylindrical body member 10 from the inlet nozzle 14 and discharged out from the outlet nozzle 15, the inert gas is enclosed or confined in the space in the double-walled structure to form a heat-insulating gas layer 3. The inert gas stayed in the upper portion of the cooling section can be vented from a small tube 21 which penetrates the heat-insulating layer 3 and communicates with the trapping section 2.

The expression "the double-walled structure is open at its lower end" as used in this specification refers not only to the case in which the lower ends of the two walls are separated from each other as indicated in FIG. 2, but also to the situation where said wall ends, even though apparently closed, are in a freely contacting state. In other words, the expression is used to include all the possible arrangements of the lower ends of the two walls except the case where the lower wall ends are secured mechanically to each other, since there is no possibility of the development of thermal stress if the wall ends are simply touching. Such a double-walled arrangement according to this invention can eliminate the gas reservoir (indicated by reference number 5 in FIG. 1) required in the prior art cold trap, thereby allowing the corresponding enlargement of the volume of the trapping section 2.

Thus, according to this invention, the inner and outer walls 11 and 12 constituting the heat-insulating gas layer 3 are not joined to each other but are separate from each other at their lower ends, so that even if there is a large difference in expansion, caused by the temperature difference, between the inner wall 11 in the low temperature section and the outer wall 12 in the high temperature section, the whole wall structure remains free of the effects of any excess stress because the two walls stay independent of each other. Also, since the expanded portion 16 is provided near the lower end of the cylindrical body member 10 to enlarge the volume of the lower part of the heat-insulating gas layer, the device can easily accommodate any possible changes of sodium pressure.

Figure 3B:
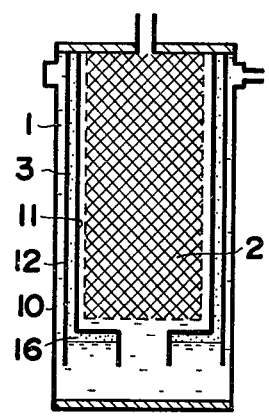

FIGS. 3A and 3B illustrate the modes of such an accommodation. FIG. 3A represents the case where the sodium pressure is low and FIG. 3B the case where the sodium pressure is high. Even when the sodium pressure rises, the heat insulating gas will not be comprised further than the lower end of the trapping section 2 owing to the presence of the expanded portion 16 storing the heat insulating gas (see FIG. 3B). If such an expanded portion storing the heat-insulating gas is not provided, the gas in the heat-insulating gas layer will be compressed when the sodium pressure rises, allowing sodium to enter the heat-insulating gas layer to induce the exchange of heat between the high-temperature section and the low-temperature section of the sodium. This makes it impossible to make the temperature in the trapping section 2 uniform, and hence it is impossible to make the best use of the cold trap. The above-described arrangements according to this invention can keep the device free of such a problem. Usually the space between the inner and outer walls 11 and 12 constituting the heat-insulating gas layer is approximately 10 mm, so that it does not entail any difficulty in the design and manufacture of the device to enlarge the gas-retaining expanded portion 16 so as to prevent the gas layer from being compressed further than the lower end of the impurity trapping section 2 when the sodium pressure rises.

Figure 4:
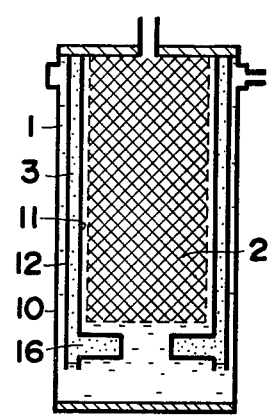
FIG. 4 is a schematic illustration of another embodiment of this invention.

In the present invention, the configurations of the expanded portion 16 storing the heat-insulating gas are not limited to those shown in FIGS. 2, 3A and 3B. It is possible to employ any other suitable configuration which ensures that the effect of the heat-insulating gas layer is not impaired when the sodium pressure rises, that is, which is capable of preventing sodium from entering the area beyond the lower end of the impurity trapping section 2. A typical example of such a configuration is shown in FIG. 4, in which the lower end of the double-walled structure is not expanded but a protruding portion 16 is formed at a part slightly above the lower end of said double-walled structure. It will be understood that it is also possible with such configuration to prevent the sodium level from rising up beyond the impurity trapping section 2 with the rise in sodium pressure.

Figure 5:
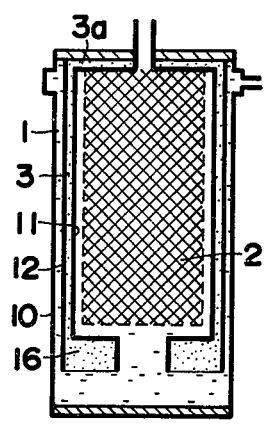
FIGS. 5 and 6 are schematic illustrations of other modified embodiments of this invention.

FIG. 5 illustrates another embodiment of the present invention in which a heat-insulating gas layer 3a is also provided over the upper end portion of the impurity trapping section 2. Namely, the upper end portion of the double-walled structure is inwardly and horizontally extended so as to cover the upper end portion of the trapping section 2. By this configuration as shown in FIG. 5, the heat insulation effect at the upper portion of the trapping section 2 is improved.

Figure 6:
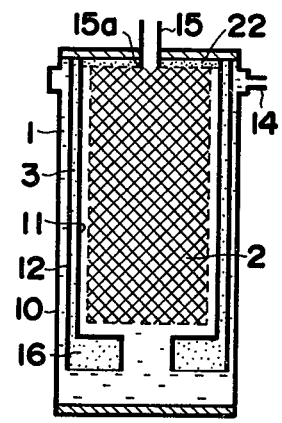

Such improved heat insulation effect at the upper portion of the trapping section 2 is also obtained by other embodiment as shown in FIG. 6, in which the lower end 15a of the sodium outlet nozzle 15 is slightly extended downwards into the trapping section 2. When liquid sodium is first introduced from the inlet nozzle 14 into the cylindrical body member 10 and discharged out from the outlet nozzle 15, the inert gas in the space between the upper end plate 20 and the lower end of the outlet nozzle 15 is not discharged to be maintained as an inert gas layer 22 in the upper end portion of the trapping section 2. This upper inert gas layer 22 provides the heat insulation effect in the same manner as the heat-insulating gas layer 3a as shown in FIG. 5.

Being constructed as described above, the cold trap according to this invention is substantially free of any restrictions concerning the strength against thermal stress of the component members of the heat-insulating gas layer and is very easy to operate. Further, in the prior art, a gas system including a pressure equalizing pipe and a gas reservoir above the cold trap is essential in order to prevent the occurrence of a pressure difference between the heat-insulating gas and the sodium. However, in the present invention, such gas system can be eliminated, thereby allowing the simplification of the internal structure and the facilitation of the design and manufacture of the device, and also enabling the attainment of the maximum impurity trapping performance under the same configurational and dimensional conditions.

While the invention has been described in its preferred embodiments, it is to be understood that modifications and variations will occur to those skilled in the art without departing from the spirit or scope of the following claims.

What is claimed is:

1. A cold trap including a section for cooling inflowing liquid sodium, a section for trapping precipitated impurities in said liquid sodium, a sodium inlet nozzle communicated with said cooling section, a sodium outlet nozzle communicated with said trapping section, and a double-walled cylindrical structure disposed between said cooling section and said trapping section, said double-walled structure being filled with a heat-insulating gas, characterized in that said double-walled cylindrical structure is closed at its upper end but open at its lower end and that an expanded portion for storing the heat insulating gas is formed at the open lower end and/or in the vicinity thereof of said double-walled structure.

2. The cold trap according to claim 1, wherein said double-walled cylindrical structure comprises an outer cylinder and an inner cylinder, the cooling section being positioned outside said outer cylinder and the trapping section being positioned inside said inner cylinder.

3. The cold trap according to claim 1, wherein said expanded portion is formed at a part slightly above the open lower end of said double-walled structure.

4. The cold trap according to claim 1, wherein said upper closed end of the double-walled structure is inwardly and horizontally extended so as to cover the upper end portion of said impurity trapping section.

5. The cold trap according to claim 1, wherein a lower end of said sodium outlet nozzle is slightly extended downwards into said impurity trapping section.

* * * * *